Patented Oct. 21, 1941

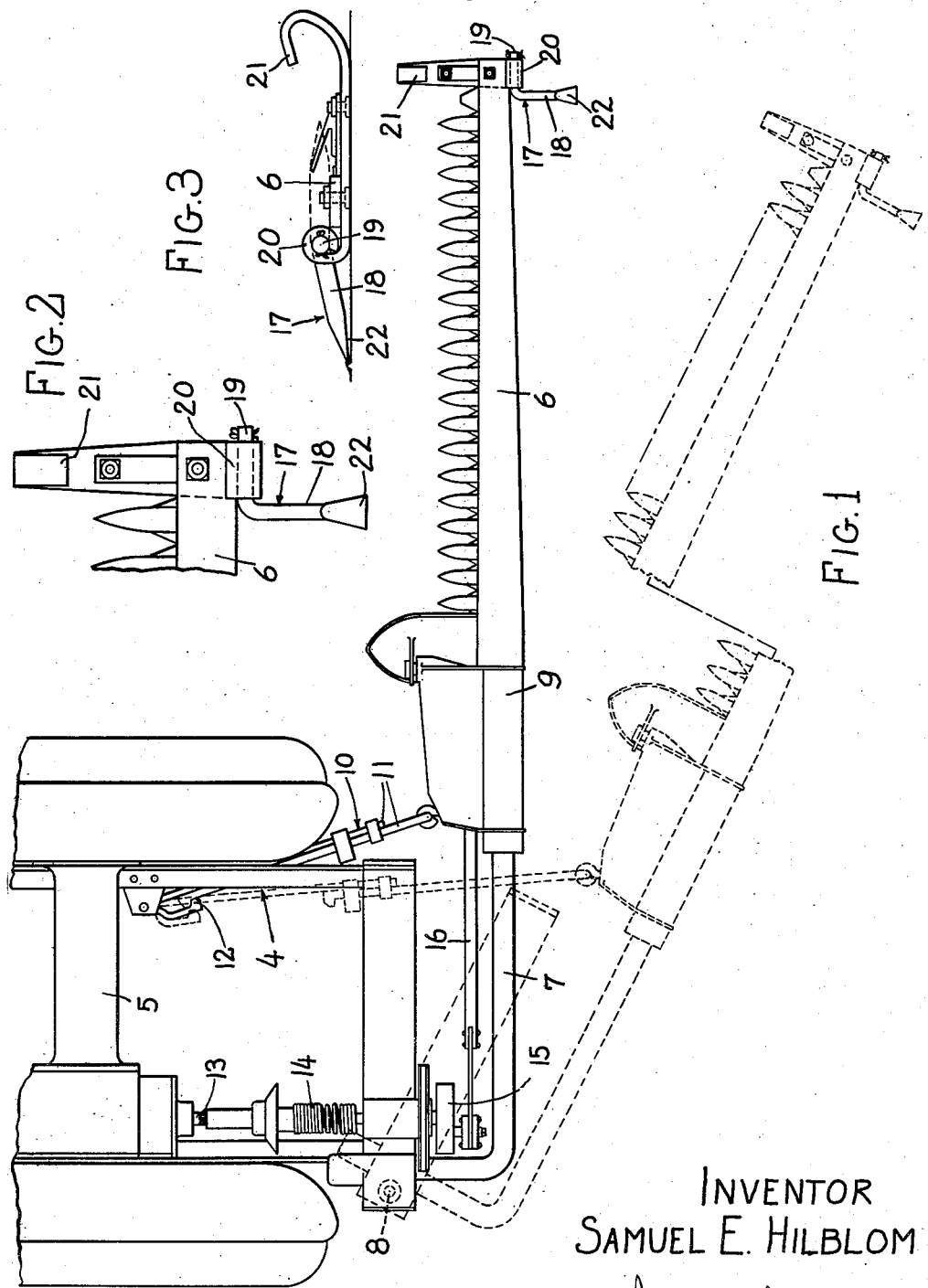

2,259,889

UNITED STATES PATENT OFFICE 2,259,889

MOWER

Samuel E. Hilblom, Chicago, Ill., assignor to International Harvester Company, a corporation of New Jersey Application September 29, 1939, Serial No. 297,139

5 Claims. (Cl. 56—25)

This invention relates to an improvement in mowers and more particularly to a resistance-offering means for the cutter-bar of a mower. The invention particularly contemplates the provision of such means in a mower having a cutter-bar of the so-called obstruction-releasable type.

A mower of the class referred to above generally comprises a supporting frame and a cutter-bar extending laterally therefrom. The cutter-bar is hingedly and pivotally associated at its inner end with the supporting frame and an additional connection is provided in the form of a releasable means for normally holding the cutter-bar in laterally extending or operative position. The release means generally comprises yieldable members which are separable when the cutter-bar strikes an obstruction, so that the cutter-bar and supporting frame have relative swinging movement about the aforesaid hinge or pivot axis, the relative movement being generally longitudinally of the direction of travel of the mower. An improved form of release means is of the type permitting recoupling thereof by moving the cutter-bar and supporting frame relatively together, after which the cutter-bar is again restored to operative position. This type of cutter-bar and supporting frame arrangement is generally confined to mowers of the type associated with tractors, wherein the supporting frame is either directly mounted on the tractor or is otherwise connected to the tractor.

Experience has shown that it is often difficult to reconnect the cutter-bar and supporting frame by backing the tractor toward the bar. This difficulty arises because no resistance is offered to the cutter-bar, and backing the tractor results in moving the cutter-bar also rearwardly. In some instances, there is enough frictional engagement between the cutter-bar and the ground to offer sufficient resistance to the cutter-bar to hold the same while the tractor and supporting frame are being moved rearwardly. In most instances, however, the cutter-bar rides freely over the ground. This disadvantage is serious in view of recent developments contemplating reconnection of the cutter-bar and supporting frame without necessitating the operator's dismounting from the tractor.

The principal object of the present invention, then, is to provide means serving to deter rearward movement of the cutter-bar when the supporting frame is moved toward the released bar for reconnection.

An important object is to mount this means generally at the outer end of the cutter-bar, so that proper leverages may be obtained to facilitate easy and quick reconnection of the bar and supporting frame.

Another object is to provide a means which does not interfere with the forward travel of the mower.

And, still another object is to provide a means which is positionable or foldable out of ground-engagement so that the mower may be backed where necessary or desirable.

Briefly and specifically, these and other important objects are achieved in one preferred form of the invention by the provision of a member pivotally carried at the outer end of an obstruction-releasable cutter-bar. This member normally trails rearwardly of the cutter-bar during forward travel thereof and offers no interference during the normal operation of the mower. The member is, however, adapted to engage the ground after the cutter-bar is released to offer resistance to the bar to deter its rearward movement, so that the supporting frame may be moved rearwardly toward the bar for reconnecting the same.

A more complete understanding of the objects and other features of the invention may be had from the following detailed description, taken in conjunction with the accompanying sheet of drawings, in which:

Figure 1 is a plan view of the rear portion of a mower of the tractor-mounted type;

Figure 2 is an enlarged plan view of the improved stop or resistance-offering means; and Figure 3 is a side elevational view of the same, showing the portion of the member.

The drawing illustrates a mower of the tractor-mounted type which comprises a supporting frame 4, in the present instance in the form of a tractor draw-bar, rigidly carried by the main body 5 of the tractor. The mower further includes a laterally extending cutter-bar 6 carried by a laterally extending coupling bar 7, which is pivotally or hingedly associated at its stubbleward end with the supporting frame 4. This hinge or pivot connection is generally disposed on a vertical axis, as at 8. The coupling bar 7 and the cutter-bar 6 are connected in the usual manner through the medium of a yoke 9.

The frame 4 and the cutter-bar 6 are further interconnected at the grassward side of the frame 4 through the medium of a releasable means 10 comprising a pair of extensible bars 11, one of which is connected at one end to the yoke 9 and the other of which is connected at one end to a forward portion of the supporting frame 4. This latter end of the release means is provided with a yieldable member 12 normally in engagement with the forward end of that bar 11 which is connected to the yoke 9. This release means thus serves to maintain the cutter-bar in laterally extending or operative position. The particular type of release means illustrated and described forms no part of the present invention but is shown merely for the purposes of illustration in connection with the obstruction-releasable cutter-bar 6.

The tractor includes a power take-off shaft 13 connected by suitable drive mechanism 14 to a pitman eccentric 15 and a pitman 16. The pitman 16 drives the knife in the usual manner.

The type of mower illustrated herein, it will be noted, includes the cutter-bar 6 and coupling bar 7 which have no relative movement horizontally, although the two are interconnected on a vertical axis for enabling the cutter-bar to be raised and lowered. The coupling bar is also mounted at its stubbleward end for vertical movement about a horizontal axis to enable the cutter-bar to follow irregularities in the ground contour. It will be understood that this mower is only one of many types having obstruction-releasable cutter-bars. Another type includes a cutter-bar hingedly carried at its inner or shoe end on the cutter-bar for relative horizontal movement about a vertical axis, the pivot being located on the shoe. Other types may include this hinge or pivot connection at other points. In all instances, however, the same problem arises in reconnecting the cutter bar and supporting frame after the cutter-bar has been released.

It will thus be seen that the improved stop or resistance-offering means, to be presently described, is adapted for use in connection with any mower having a cutter-bar of the obstruction-releasable type.

A preferred form of stop means is illustrated as comprising an L-shaped member 17 having a rearwardly extending leg 18 and a laterally extending leg 19. The member 17 is movably or pivotally carried at the outer end of the cutter-bar through the medium of a bearing 20 having a laterally extending bore which journals the leg 19. The bearing 20, in the present instance, is formed as an integral part of a cutter-bar outer shoe 21 rigidly carried at the outer end of the cutter-bar. The member 17 is thus carried by the cutter-bar on a laterally extending horizontal axis, the leg 18 normally trailing rearwardly of the cutter-bar and, since yieldable upwardly, offering no interference with the forward travel of the mower. The weight of the leg 18 is sufficient to maintain the same in engagement with the ground, and the rearward end thereof is preferably flattened and sharpened, as at 22, to insure effective engagement with the ground to deter rearward movement of the cutter-bar, when necessary.

As previously mentioned, the particular manner of mounting the member 17 provides that no interference will be offered with the forward travel of the mower, and the mower is operated in the usual manner. When the cutter-bar 6 strikes an obstruction, the member 12 becomes disengaged from the forward end of that member 11 which is connected to the yoke 9. The members 11 are then separable to permit relative swinging movement of the cutter-bar and the supporting frame 4 about the vertical pivot 8. It will be understood, of course, that the cutter-bar 6 does not swing wholly rearwardly but that the movement between the cutter-bar and the tractor is relative. In effect, the cutter-bar, having struck the obstruction, may be regarded as remaining substantially in position while the tractor and supporting frame move forwardly relative thereto. It will thus be seen that the stop member 17 does not interfere with the necessary separation of the cutter-bar and supporting frame.

The particular type of release means shown includes stop means to prevent complete separation thereof and the cutter-bar and supporting frame having limited relative movement. As previously mentioned, however, the particular form of release means is not material as far as the function of the stop member 17 is concerned.

The released position of the cutter-bar 6 is generally indicated in broken lines in Figure 1. When the cutter-bar is so released, the usual procedure is to back the tractor and supporting frame toward the bar for reconnecting the two. The tractor is then driven forwardly and the cutter-bar is lifted to pass over the obstruction.

The principal difficulty, as previously mentioned, is in reconnecting the cutter-bar and frame, since the backward travel of the tractor has the effect of moving the cutter-bar also rearwardly. The stop member provided by the present invention eliminates this difficulty, for the sharpened end 22 of the leg 18 engages the ground to prevent or to deter this rearward movement of the cutter-bar. Because of the pivotal mounting of the member and the angle at which the leg 18 extends rearwardly, continued rearward pressure on the cutter-bar 6 serves to engage the member more firmly with the ground. The tractor and supporting frame may then be moved rearwardly toward the cutter-bar and a quick, automatic reconnection thereof may be effective without necessitating the operator's dismounting from the tractor.

It may be desirable at times to back the mower for considerable distances. In such cases, it may be that the stop member would offer undesirable interference with such rearward movement. This interference may be eliminated, according to the present invention, by positioning or folding the member forwardly over or on top of the end of the cutter-bar, as shown in broken lines in Figure 3. The member may be easily restored to its original position for engagement with the ground to facilitate reconnection of the cutter-bar and supporting frame during normal operation.

From the foregoing description, it will be seen that a simple and efficient means has been provided for preventing or deterring rearward movement of the cutter-bar of the obstruction-releasable type, the principal function of the means being to enable easy and quick reconnection of the cutter-bar with the supporting frame on which it is carried. It will be understood, of course, that only a preferred embodiment of the invention has been illustrated and described and that numerous modifications and alterations may be made therein without departing from the spirit and scope of the invention as defined in the appended claims.

What is claimed is:

1. In a mower including a supporting frame and an obstruction-releasable cutter-bar, the frame and cutter-bar being relatively separable when the cutter-bar strikes an obstruction, the frame and bar being reconnectable upon movement of the frame toward the bar, the combination with the bar of means carried thereby and engageable with the ground to deter movement of the bar when the frame is moved toward the bar for reconnection therewith.

2. In a mower including a supporting frame and an obstruction-releasable cutter-bar, the frame and cutter-bar being relatively separable when the cutter-bar strikes an obstruction, the frame and bar being reconnectable upon movement of the frame rearwardly toward the bar, the combination with the bar of means carried thereby and engageable with the ground to deter movement of the bar when the frame is moved rearwardly toward the bar for reconnection therewith, said member being foldable on top of the bar for permitting rearward movement of the bar.

3. In a mower including a supporting frame and an obstruction-releasable cutter-bar, the frame and cutter-bar being relatively separable when the cutter-bar strikes an obstruction, the frame and bar being reconnectable upon movement of the frame toward the bar, the combination with the bar of a member movably carried thereby and normally trailing rearwardly thereof, said member engaging the ground to deter movement of the bar when the frame is moved toward the bar for reconnection therewith.

4. In a mower including a supporting frame and an obstruction-releasable cutter-bar, the frame and cutter-bar being relatively separable when the cutter-bar strikes an obstruction, the frame and bar being reconnectable upon movement of the frame rearwardly toward the bar, the combination with the bar of a member movably carried thereby and normally trailing rearwardly thereof, said member engaging the ground to deter movement of the bar when the frame is moved rearwardly toward the bar for reconnection therewith, said member being positionable out of ground-engaging position for permitting rearward movement of the bar.

5. In a mower including a supporting frame and an obstruction-releasable cutter-bar, the frame and cutter-bar being relatively separable when the cutter-bar strikes an obstruction, the frame and bar being reconnectable upon movement of the frame rearwardly toward the bar, the combination with the bar of a member movably carried thereby and normally trailing rearwardly thereof, said member being yieldable upwardly during forward movement of the cutter-bar and engageable with the ground to deter rearward movement of the bar when the frame is moved rearwardly for reconnection therewith.

SAMUEL E. HILBLOM.